US010983782B1

(12) United States Patent
Mitra et al.

(10) Patent No.: US 10,983,782 B1
(45) Date of Patent: Apr. 20, 2021

(54) USER INTERFACE UPGRADE ANALYZER

(71) Applicant: SAP SE, Walldorf (DE)

(72) Inventors: Paulami Mitra, Ranchi (IN); Garima Srivastava, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/778,486

(22) Filed: Jan. 31, 2020

(51) Int. Cl.
G06F 8/65 (2018.01)
G06F 8/71 (2018.01)
G06F 9/451 (2018.01)
G06F 3/0482 (2013.01)

(52) U.S. Cl.
CPC .............. G06F 8/65 (2013.01); G06F 8/71 (2013.01); G06F 9/451 (2018.02); G06F 3/0482 (2013.01)

(58) Field of Classification Search
None
See application file for complete search history.

(56) References Cited

U.S. PATENT DOCUMENTS

| 9,110,770 | B1* | 8/2015 | Raju | G06F 8/77 |
| 2005/0203975 | A1* | 9/2005 | Jindal | G06F 8/38 |
| 2009/0265697 | A1* | 10/2009 | Bhat | G06F 8/71 |
| | | | | 717/163 |
| 2011/0153559 | A1* | 6/2011 | Rangarajan | G06F 40/174 |
| | | | | 707/609 |
| 2011/0302564 | A1* | 12/2011 | Byers | G06F 8/36 |
| | | | | 717/146 |
| 2012/0222025 | A1* | 8/2012 | Pandit | G06F 8/658 |
| | | | | 717/170 |
| 2012/0227061 | A1* | 9/2012 | Hunt | G06F 8/71 |
| | | | | 719/331 |
| 2014/0282457 | A1* | 9/2014 | Chow | G06F 8/54 |
| | | | | 717/164 |
| 2015/0040112 | A1* | 2/2015 | Valencia | G06F 8/36 |
| | | | | 717/168 |
| 2015/0169386 | A1* | 6/2015 | Gopalraj | G06F 9/541 |
| | | | | 719/328 |
| 2017/0337052 | A1* | 11/2017 | Elkabany | G06F 8/71 |
| 2019/0079734 | A1* | 3/2019 | Kadam | G06F 8/65 |

* cited by examiner

Primary Examiner — Philip Wang
(74) Attorney, Agent, or Firm — Buckley, Maschoff & Talwalkar LLC

(57) ABSTRACT

Systems and methods provide determination of a first user interface application associated with a first version of user interface code libraries, and reception of a request to analyze compatibility of the first user interface application with a second version of user interface code libraries. In response to the request the second version of user interface code libraries is retrieved, it is determined whether one or more user interface code libraries referenced in the first user interface application are not in the second version of user interface code libraries, and, if it is determined that one or more user interface code libraries referenced in the first user interface application are not in the second version of user interface code libraries, a message is presented indicating that one or more user interface code libraries referenced in the first user interface application are not in the second version of user interface code libraries.

17 Claims, 10 Drawing Sheets

USER INTERFACE UPGRADE ANALYZER

BACKGROUND

Conventional software architectures may include a user interface layer, a service layer and a data layer. An end-to-end application may therefore include a user interface application at the user interface layer, server code implementing application logic at the service layer, and database artifacts at the data layer. The user interface application may utilize generally-available code libraries for implementing some user interface controls. For example, UI5 is an application framework which includes downloadable code libraries and facilitates the design of cross-platform applications.

New versions of user interface code libraries may be periodically released. The new versions may deprecate libraries which were available in prior versions. In some instances, a function of a deprecated library may be replaced with another function of another library. Due to these changes, a user interface application written in view of one version of user interface code libraries might not be compatible with a newer version of the user interface code libraries. Such incompatibilities may result in undesirable application behavior or, at worst, an inability to load the user interface application.

End-users and developers of user interface applications may therefore hesitate to upgrade their user interface applications to use a newer version of user interface code libraries. Systems are therefore desired to efficiently identify issues which may arise as a result of such an upgrade. Systems are also desired to efficiently address identified issues.

DETAILED DESCRIPTION

The following description is provided to enable any person in the art to make and use the described embodiments. Various modifications, however, will remain readily-apparent to those in the art.

Some embodiments facilitate the identification of issues which may arise as a result of upgrading a user interface (UI) application written in view of a first version of a set of code libraries to a second version of the set of code libraries. A system according to some embodiments may also propose code changes to the UI application in order to address one or more identified issues.

Figure 1:
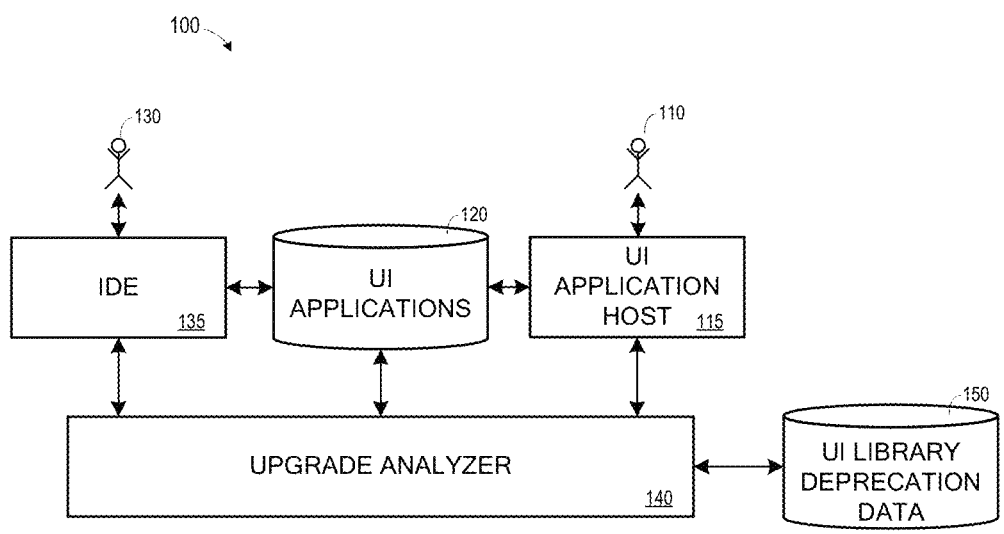
FIG. 1 illustrates an architecture to provide UI upgrade analysis to end-users and developers according to some embodiments.

FIG. 1 is a block diagram of architecture 100 according to some embodiments. The illustrated elements of architecture 100 may be implemented using any suitable combination of computing hardware and/or software that is or becomes known. In some embodiments, two or more elements of architecture 100 are implemented by a single computing device. One or more elements of architecture 100 may be implemented as a cloud service (e.g., Software-as-a-Service, Platform-as-a-Service).

During operation, end-user 110 may operate UI application host 115 (e.g., a launchpad application executing within a Web browser) to load and execute a UI application of UI applications 120. The UI application is associated with a particular version of UI code libraries, which is typically specified within the application code. Loading of the UI application includes fetching code libraries of the specified version in order to implement UI controls specified within the UI application. In another example of operation, developer 130 operates integrated development environment (IDE) 135 to create or modify code of a UI application of UI applications 120.

Upgrade analyzer 140 may be accessed via UI application host 115 or via IDE 135. Upgrade analyzer 140 may identify errors which may occur if a specified UI application 120 associated with a particular version of UI code libraries is used with a different version of the UI code libraries.

In one example, upgrade analyzer 140 may operate to load a specified UI application 120 of UI applications 120. Loading of the UI application 120 includes fetching code libraries of the associated version and determining whether any libraries specified in the UI application 120 are missing from the fetched code libraries. The code libraries may be fetched from a publicly-available repository of code libraries for a UI framework (not shown) as is known in the art.

In a case that upgrade analyzer 140 is accessed via IDE 135, upgrade analyzer 140 may also determine which controls of the UI application 120 are impacted by the missing code libraries and determine whether any substitutions for the impacted controls exist in the fetched code libraries. Developer 130 may choose to enact one or more of the determined substitutions, in which case upgrade analyzer 140 may modify the UI application 120 accordingly.

Upgrade analyzer 140 may access UI library deprecation data 150 to determine alternatives for controls used in the UI application 120 which are impacted by the missing libraries. According to some embodiments, UI library deprecation data 150 includes information regarding deprecated controls and any alternative controls which exist in more-recent code library versions. UI library deprecation data 150 may be generated by fetching documentation provided by the UI framework provider using an associated hyperlink and parsing the documentation to identify the deprecated controls and their version-specific alternatives. The UI framework may also provide such deprecation data directly.

Figure 2:
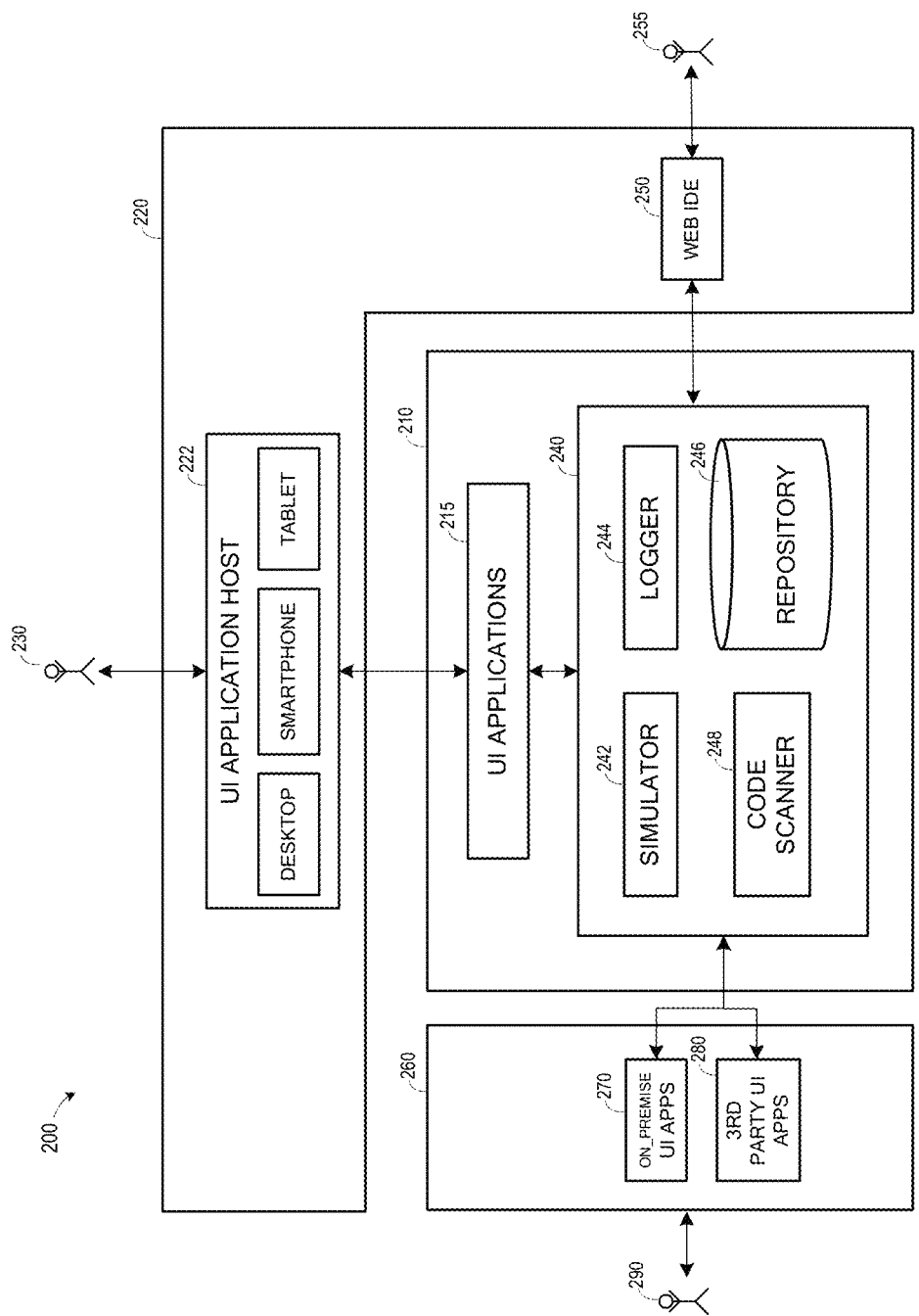
FIG. 2 illustrates an architecture to provide UI upgrade analysis to Web-based end-users and on-premise and Web-based developers according to some embodiments.

FIG. 2 illustrates architecture 200 according to some embodiments. Architecture 200 may comprise an implementation of architecture 100 of FIG. 1. Architecture 200 may provide UI upgrade analysis for both cloud-based and on-premise UI application usage and/or development.

In particular, cloud platform 210 may provide a cloud-based environment for accessing and execution of UI applications 215. Web client 220, which may comprise a Web browser, similarly provides an environment for execution of UI application host 222, which in turn may comprise a launchpad through which end-user 230 may access one or more of UI applications 215 executing within platform 210. As shown, UI application host 222 includes components to present user interfaces of UI applications 215 via various client devices (e.g., desktop, smartphone, tablet) as is known in the art.

Cloud platform 210 also includes UI upgrade analyzer 240. According to the illustrated embodiment, UI upgrade analyzer 240 includes simulator 242, logger 242, repository 246 and code scanner 248. Simulator 242 may be responsible for loading a specified UI application 215 in a background process based on a specified UI code library version. Simulator 242 therefore fetches code libraries of the specified version and identifies code libraries which are referenced in the specified UI application but missing from the fetched code libraries. Simulator 242 may transmit these errors to logger 244.

Logger 244 stores any errors in repository 246. In a case that upgrade analyzer 240 has been accessed by an end-user via UI application host 222, any errors are noted to the end-user and the background process terminates.

Web client 220 may also execute a Web-based IDE 250 supported by cloud platform 210. Web-based IDE 250 may access upgrade analyzer 240 to provide the above-described functionality to developer 255 with respect to a UI application 215 which is under development. Specifically, simulator 242 and logger 240 may operate as described above to load the UI application, fetch UI code libraries of a specified version, and log errors in repository 246.

In addition, code scanner 248 may operate to determine which controls of the UI application are impacted by the missing code libraries, to determine whether any alternative controls exist in the fetched code libraries which may be substituted for the impacted controls, and to present such alternative controls to developer 255. Repository 246 may store information regarding the deprecation of controls through successive code library versions and any alternatives to the deprecated controls which may exist in each version. Code scanner 248 may therefore access repository 246 to identify controls of the UI application which have been deprecated and any alternative controls which are provided by the specified code library version. If developer 255 accepts one or more of the alternative controls, code scanner 248 may modify the specified UI application to substitute the one or more alternative controls for the corresponding impacted controls.

On-premise system 260 also supports development and execution of UI applications. These applications may include on-premise UI applications 270 and third-party UI applications 280. As described above, on-premise developer 290 may access UI upgrade analyzer 240 via either of UI applications 270 or UI applications 280 to analyze and potentially correct the impact of a code library upgrade on such UI applications.

Figure 3:
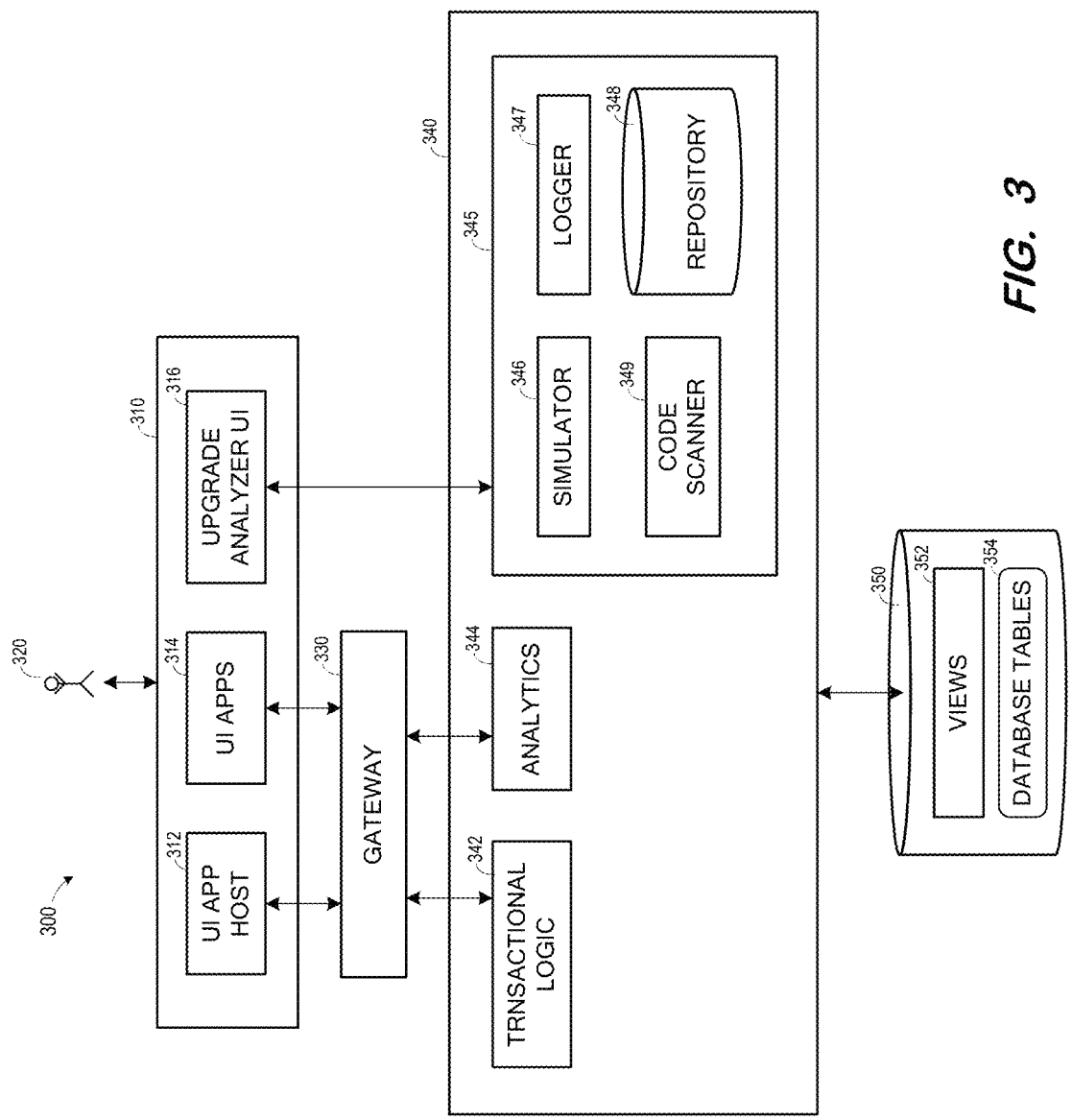
FIG. 3 illustrates an architecture to provide UI upgrade analysis to on-premise end-users according to some embodiments.

Architecture 300 of FIG. 3 illustrates an on-premise scenario according to some embodiments. End-user 320 may access UI software component 310 (e.g., a Web browser) which supports UI application host 312, UI applications 314 and upgrade analyzer UI 316. UI application host 312 may provide an entry point to UI applications 314, and both may access transaction logic 342 and analytics 344 implemented by server-executable code and executing within server 340. In response to such access, transaction logic 342 and analytics 344 may generate queries against views 352 and/or database tables 354 of data store 350 and return results to UI applications 314 as is known in the art.

Upgrade analyzer UI 316 may comprise a front-end component which communicates with backend upgrade analyzer engine 345 executing within server 340. Backend upgrade analyzer engine 345 includes simulator 346, logger 347, repository 348 and code scanner 349. Upon receiving a request from upgrade analyzer UI 316, simulator 346 may load a specified UI application 314 in a background process by fetching code libraries of a specified code library version. Errors which occur during such fetching (e.g., due to missing code libraries) are transmitted to logger 347.

Code scanner 349 may further operate to access repository 348 and identify controls of the UI application which have been deprecated and any alternative controls which are provided by the specified code library version. If user 320 accepts one or more of the alternative controls, code scanner 349 may modify the specified UI application to substitute the one or more alternative controls for the corresponding impacted controls.

The data stored within data store 350 may comprise one or more of conventional tabular data, row-based data, column-based data, and object-based data. The data may be distributed among several relational databases, dimensional databases, and/or other data sources. Moreover, the data may be indexed and/or selectively replicated in an index to allow fast searching and retrieval thereof.

Data store 350 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Figure 4:
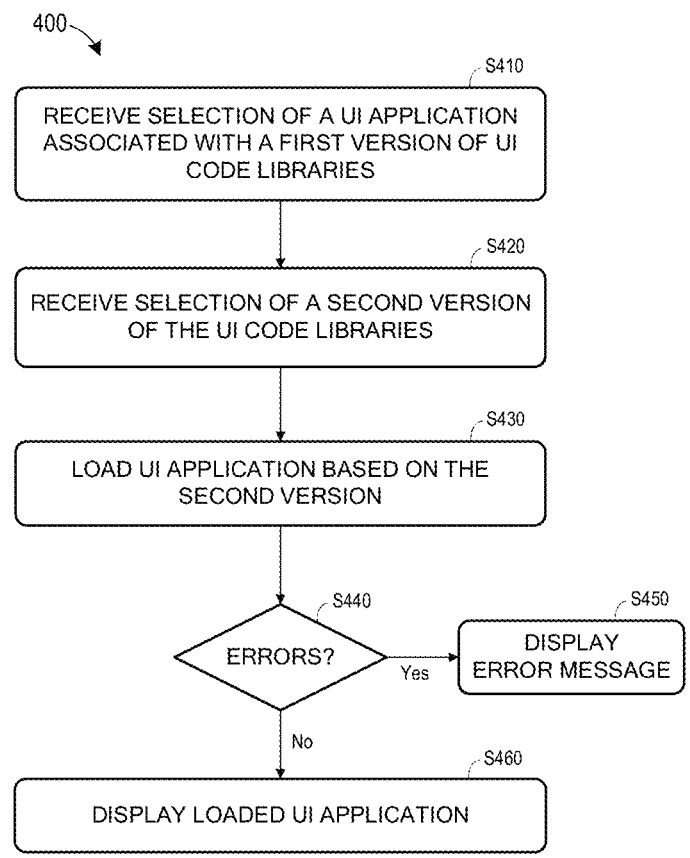
FIG. 4 is flow diagram of a process to provide UI upgrade analysis to an end-user according to some embodiments.

FIG. 4 is a flow diagram of process 400 according to some embodiments. Process 400 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Initially, a selection of a UI application is received at S410. The selected UI application is associated with a first version of UI code libraries. The selection may be received via any process that is or becomes known.

Figure 5:
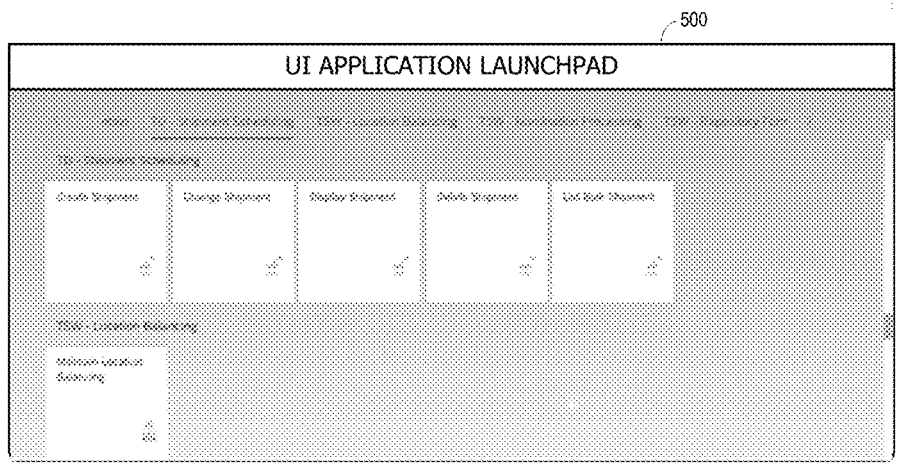
FIG. 5 is a view of a user interface of a UI application host according to some embodiments.
Figure 6:
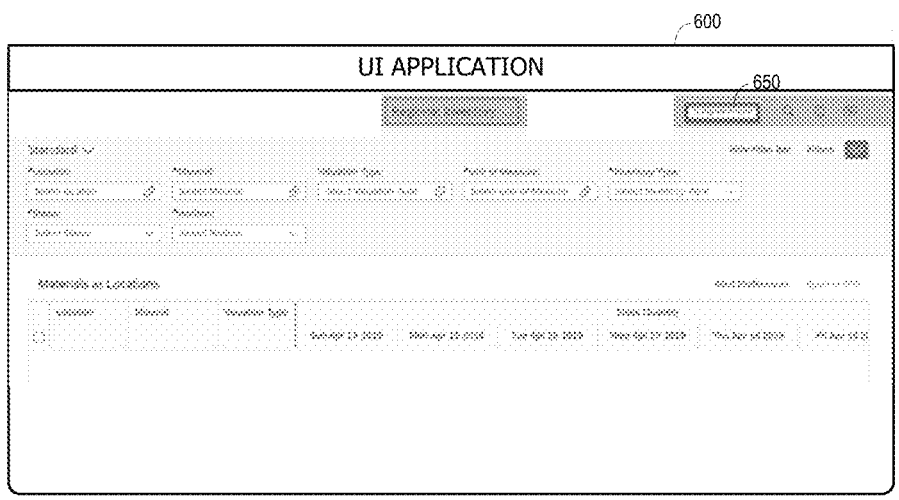
FIG. 6 is a view of a user interface of a UI application host according to some embodiments.

FIG. 5 illustrates selection of a UI application at S410 according to some embodiments. User interface 500 may be displayed on a client device (e.g., a display of a desktop computer) in response to execution of a Web browser application. The user has selected or otherwise input a Uniform Resource Locator associated with a UI application host, or launchpad, causing user interface 500 to display a corresponding Web page. According to some embodiments, the user is subjected to an authorization protocol (e.g., password, multi-factor authentication) prior to being presented with user interface 500.

User interface 500 displays tiles corresponding to respective UI applications which may be selected to "launch" a respective UI application. It will be assumed that the user selects one of the tiles, causing display of user interface 600 of a UI application corresponding to the selected tile. As described above, the selected UI application utilizes a specific version of a UI framework including UI code libraries to provide various UI controls to the user. The version may be noted in the code of the UI application and referred to during loading of the application to determine the particular version of UI code libraries which should be fetched during loading.

Figure 7:
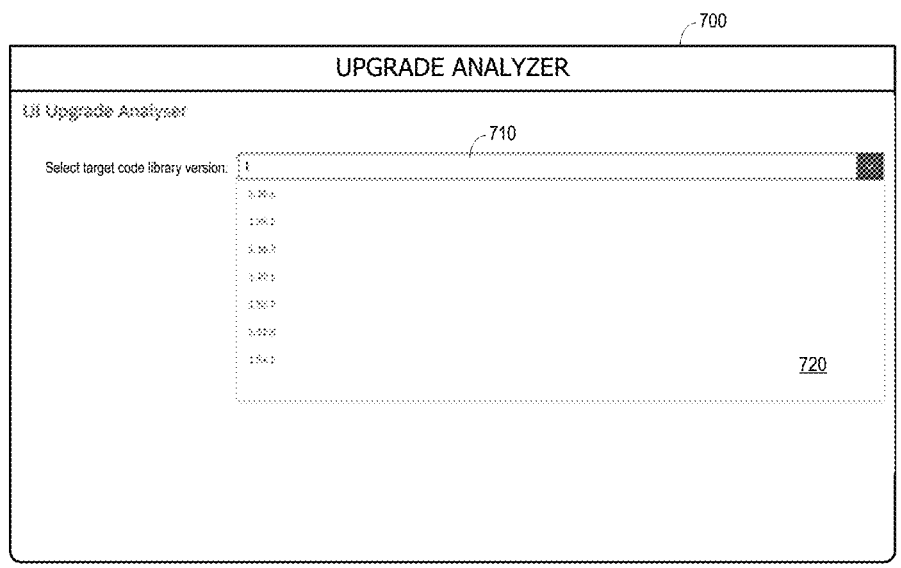
FIG. 7 is a view of a user interface of a UI upgrade analyzer according to some embodiments.

A selection of a second version of the UI code libraries is received at S420. Returning to the present example, user interface 600 includes "UI Upgrade Analyzer" control 650. The user may select control 650 to access an upgrade analyzer such as upgrade analyzer 140 of FIG. 1, analyzer 240 of FIG. 2, and/or upgrade analyzer engine 345 of FIG. 3, depending on the deployment scenario. FIG. 7 shows user interface 700 of such an upgrade analyzer which is displayed as a result of such a selection according to some embodiments. User interface 700 includes drop-down field 710 from which a version of UI code libraries may be selected at S420.

In response to the selection, the UI application is again loaded at S430, but in conjunction with the second version of the UI code libraries. In particular, the application may be loaded in a background process by fetching code libraries of the second code library version. At S440, it is determined whether any code libraries required by the UI application are not included in the fetched code libraries. If so, an error message is displayed at S450 indicating to the user that the second version of the code libraries is incompatible with the UI application.

If no errors occur during loading of the UI application, flow proceeds to S460 to display the loaded UI application. The UI application may be presented in a preview mode which prevents any changes to back-end data but allows the user to evaluate any visual changes to UI controls which would result from upgrading the UI application to the second version of the code libraries.

Figure 8:
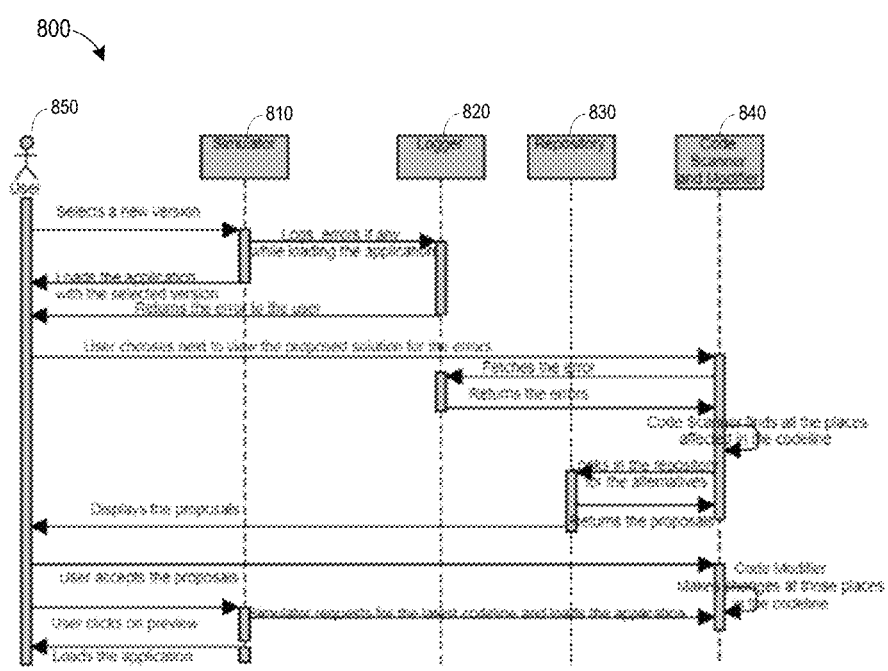
FIG. 8 is a sequence diagram of a process to provide UI upgrade analysis to a developer according to some embodiments.

Process 400 of FIG. 4 depicts a UI upgrade analysis intended for a typical UI application end-user. FIG. 8 includes sequence diagram 800 illustrating operation of various components of a UI upgrade analyzer in response to a UI upgrade analysis initiated by a UI application developer. Process 400 and sequence diagram 800 are not limited to execution in these contexts. For example, process 400 may be executed for a UI application developer, and/or sequence diagram 800 may represent a UI upgrade analysis initiated by any entity authorized to modify code of a UI application under analysis.

According to sequence diagram 800, a UI upgrade analyzer includes simulator 810, logger 820, repository 830 and code scanner and modifier 840. These components may operate similarly to the similarly-named components described above.

Figure 9:
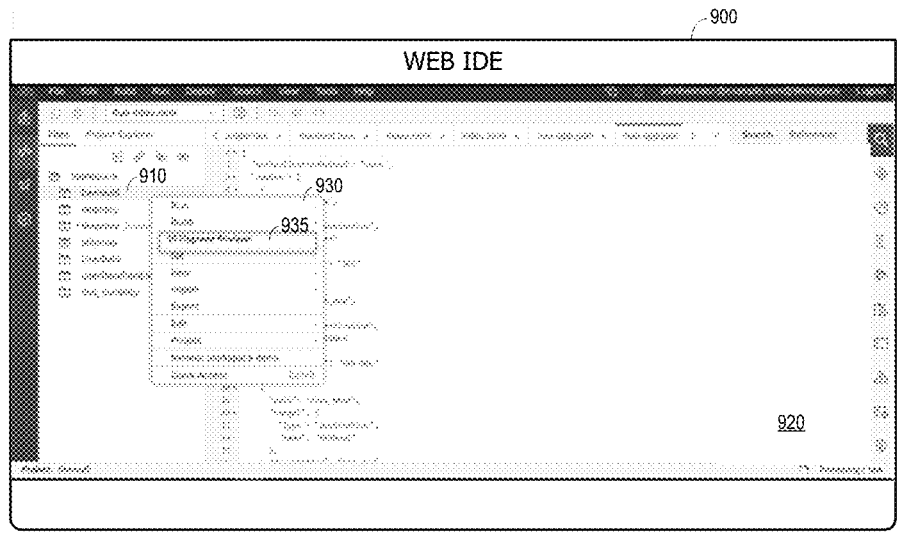
FIG. 9 is a view of a user interface of a development environment according to some embodiments.

According to the present example, user 850 is a UI application code developer. User 850 may operate an IDE application to develop code of a UI application. FIG. 9 illustrates user interface 900 of an IDE application according to some embodiments. User interface 900 includes directory 910 specifying various components, and editor area 920 for writing and modifying code of the various components.

As shown, user 850 has right-clicked on component 910 to cause display of context menu 930. It will be assumed that option 935 "UI Upgrade Analyzer" is then selected. Selection of such an option may invoke a UI upgrade analysis engine as described herein.

Figure 10:
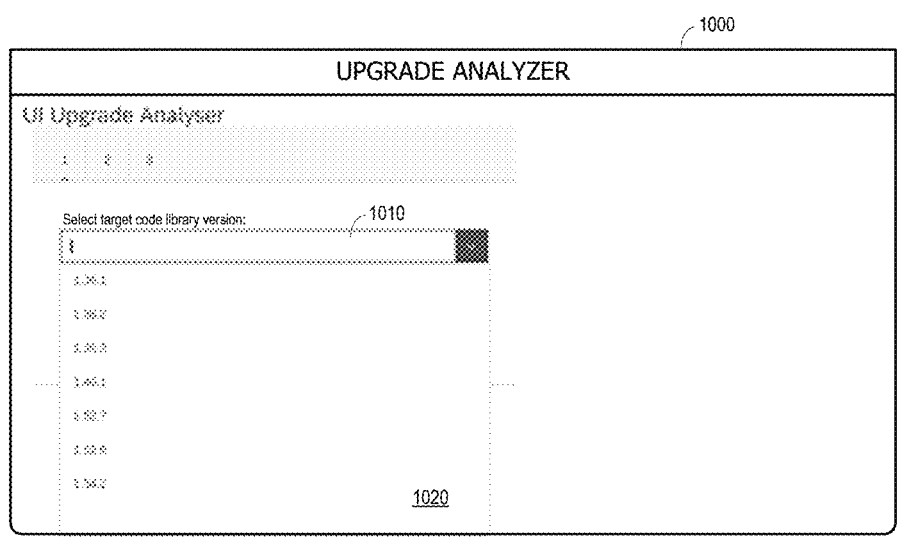
FIG. 10 is a view of a user interface of a UI upgrade analyzer according to some embodiments.

For example, in response to selection of option 935, simulator 810 may present interface 1000 of FIG. 10. User interface 1000 includes drop-down field 1010 from which list 1020 of UI code library versions may be selected. Selection of one of the code library versions is received by simulator 810 as shown in FIG. 8.

Figure 11:
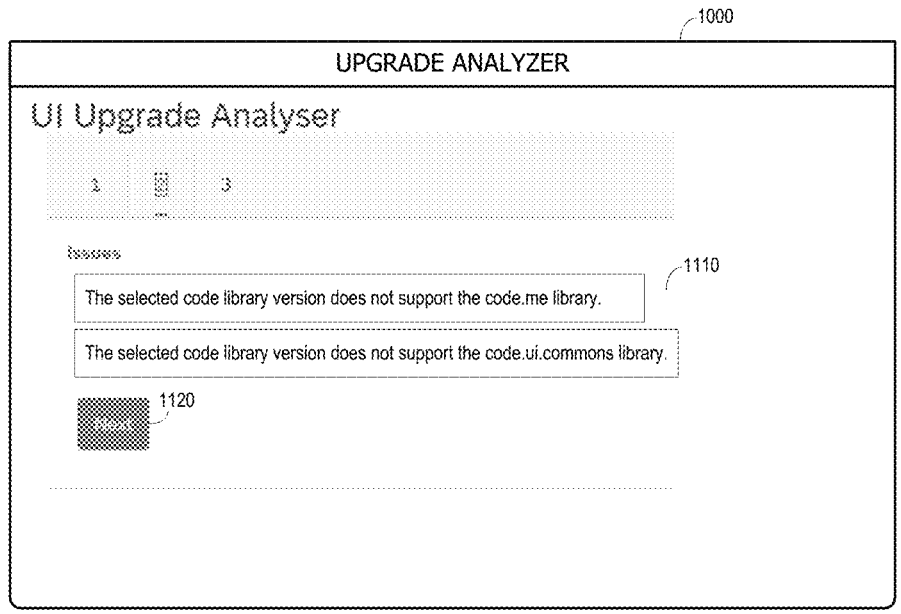
FIG. 11 is a view of a user interface of a UI upgrade analyzer according to some embodiments.

In response, simulator 810 loads the UI application for which the upgrade analysis is to be performed. Simulator 810 therefore fetches UI code libraries of the selected version and identifies errors in cases where code libraries which are referenced in the specified UI application are missing from the fetched code libraries. Simulator 810 logs these errors to logger 820 and returns the errors to the user. FIG. 11 shows user interface 1000 indicating identified errors 1110 according to some embodiments.

The user chooses Next control 1120 to view proposed solutions to the identified errors. In response, code scanner and modifier 840 fetches the errors from logger 820. Code scanner and modifier determines which controls of the UI application are impacted by the missing code libraries and queries repository 830 for alternatives to the impacted controls. Any returned alternatives are then provided to user 850.

Figure 12:
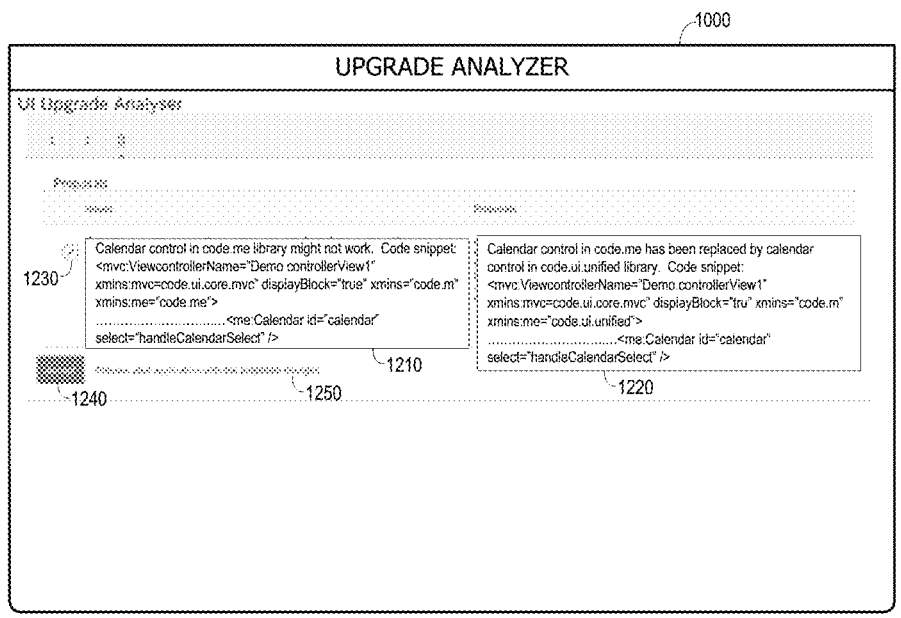
FIG. 12 is a view of a user interface of a UI upgrade analyzer according to some embodiments.

FIG. 12 shows example interface 1000 displaying description 1210 of an impacted control and description 1220 of an alternative control. Checkbox 1230 allows user 850 to select the alternative control and Accept control 1240 control causes code scanner and modifier 840 to modify the UI application code to substitute the selected alternative control for the impacted control. Selection of preview link 1250 causes simulator 810 to load the modified UI application code and the newly-selected UI code library version and present the loaded UI application to user 850. Consequently, user 850 is able to determine whether the modification to the UI application code has resulted in compatibility with the newly-selected version.

Figure 13:
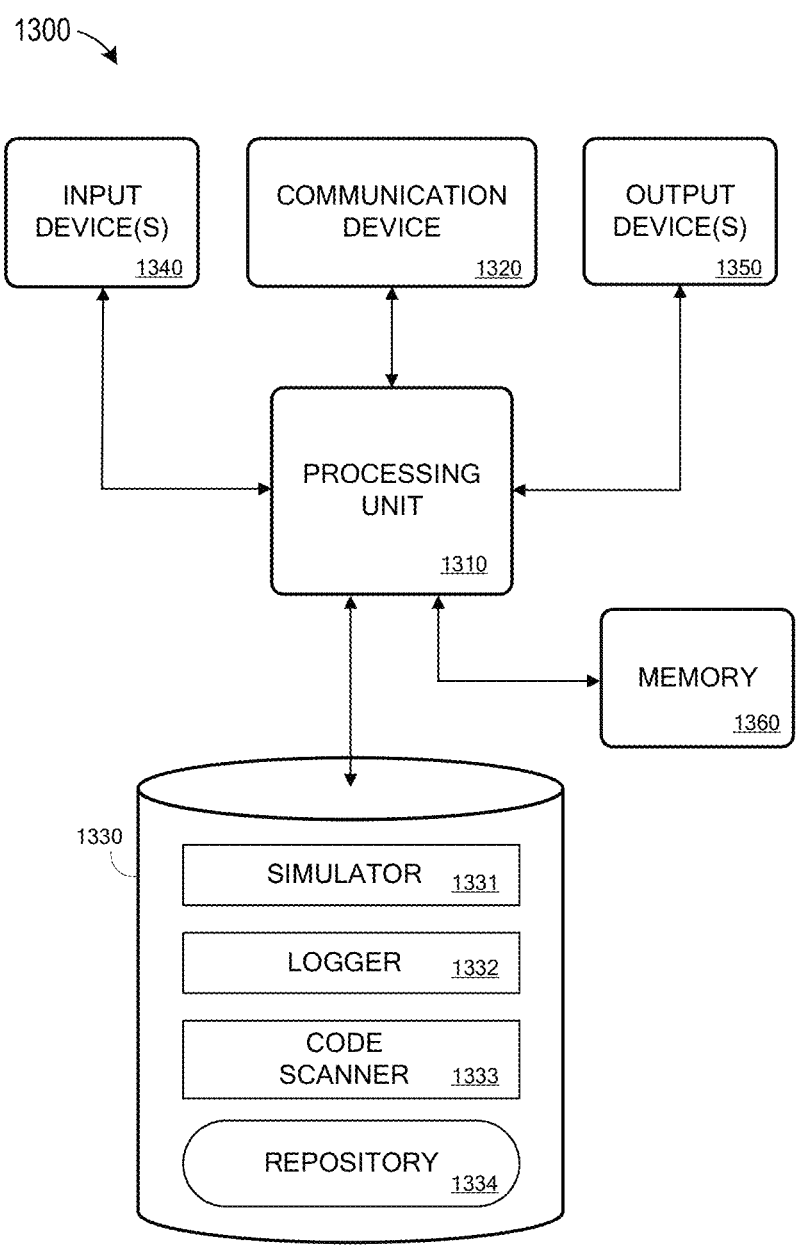
FIG. 13 is a block diagram of a system to provide UI upgrade analysis according to some embodiments.

FIG. 13 is a block diagram of apparatus 1300 according to some embodiments. Apparatus 1300 may comprise a general-purpose computing apparatus and may execute program code to perform any of the functions described herein. Apparatus 1300 may comprise an implementation of platform 210 in some embodiments. Apparatus 1300 may include other unshown elements according to some embodiments.

Apparatus 1300 includes processing unit 1310 operatively coupled to communication device 1320, data storage device 1330, one or more input devices 1340, one or more output devices 1350 and memory 1360. Communication device 1320 may comprise a network card for communication with external networks. Input device(s) 1340 may comprise, for example, a keyboard, a keypad, a mouse or other pointing device, a microphone, knob or a switch, an infra-red (IR) port, a docking station, and/or a touch screen. Input device(s) 1340 may be used, for example, to enter information into apparatus 1300. Output device(s) 1350 may comprise, for example, a display (e.g., a display screen), a speaker, and/or a printer.

Data storage device 1330 may comprise any appropriate persistent storage device, including combinations of magnetic storage devices (e.g., magnetic tape, hard disk drives and flash memory), optical storage devices, Read Only Memory (ROM) devices, etc., while memory 1360 may comprise Random Access Memory (RAM), Storage Class Memory (SCM) or any other fast-access memory.

Simulator 1331, logger 1332, and code scanner 1333 may comprise program code executable by processor 1310 to cause apparatus 1300 to perform any one or more of the processes described herein. Embodiments are not limited to execution of these processes by a single apparatus.

Repository 1334 as described above may be stored in data storage device 1330. Data storage device 1330 may also store data and other program code for providing additional functionality and/or which are necessary for operation of apparatus 1300, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
 a memory storing processor-executable program code;
 a processing unit to execute the processor-executable program code to cause the system to:
 determine a first user interface application associated with a first version of user interface code libraries;
 receive a selection of a second version of user interface code libraries; and
 in response to the selection:
  retrieve the second version of user interface code libraries;
  determine whether one or more user interface code libraries referenced in the first user interface application are not in the second version of user interface code libraries; and
  if it is determined that one or more user interface code libraries referenced in the first user interface application are not in the second version of user interface code libraries:
   determine one or more user interface controls of the one or more user interface code libraries which are referenced in the first user interface application;
   determine one or more user interface controls of the second version of user interface code libraries to substitute for corresponding ones of the one or more user interface controls of the one or more user interface code libraries which are referenced in the first user interface application; and
   present the determined one or more user interface controls of the second version of user interface code libraries.

2. A system according to claim 1, the processing unit to execute the processor-executable program code to cause the system to:
 receive an instruction to substitute the determined one or more user interface controls of the second version of user interface code libraries for corresponding ones of the one or more user interface controls of the one or more user interface code libraries which are referenced in the first user interface application; and
 modify the first user interface application to substitute the determined one or more user interface controls of the second version of user interface code libraries for corresponding ones of the one or more user interface controls of the one or more user interface code libraries which are referenced in the first user interface application.

3. A system according to claim 2, wherein determination of the one or more user interface controls of the second version of user interface code libraries to substitute for corresponding ones of the one or more user interface controls of the one or more user interface code libraries comprises:
 querying of a repository storing user interface code library deprecation information.

4. A system according to claim 2, wherein the determination of the first user interface application associated with the first version of user interface code libraries comprises reception of a request from an integrated development environment application.

5. A system according to claim 1, wherein the determination of the first user interface application associated with the first version of user interface code libraries comprises reception of a request from an integrated development environment application.

6. A system according to claim 1, wherein the determination of the first user interface application associated with the first version of user interface code libraries comprises reception of a request from the first user interface application.

7. A computer-implemented method comprising:
 determining a first user interface application associated with a first version of user interface code libraries;
 receiving a request to analyze compatibility of the first user interface application with a second version of user interface code libraries; and
 in response to the request:
  retrieving the second version of user interface code libraries;
  determining whether one or more user interface code libraries referenced in the first user interface application are not in the second version of user interface code libraries; and if it is determined that one or more user interface code libraries referenced in the first user interface application are not in the second version of user interface code libraries:
    determining one or more user interface controls of the one or more user interface code libraries which are referenced in the first user interface application;
    determining one or more user interface controls of the second version of user interface code libraries to substitute for corresponding ones of the one or more user interface controls of the one or more user interface code libraries which are referenced in the first user interface application; and
    presenting the determined one or more user interface controls of the second version of user interface code libraries.

8. A method according to claim 7, further comprising:
receiving an instruction to substitute the determined one or more user interface controls of the second version of user interface code libraries for corresponding ones of the one or more user interface controls of the one or more user interface code libraries which are referenced in the first user interface application; and
modifying the first user interface application to substitute the determined one or more user interface controls of the second version of user interface code libraries for corresponding ones of the one or more user interface controls of the one or more user interface code libraries which are referenced in the first user interface application.

9. A method according to claim 8, wherein determining the one or more user interface controls of the second version of user interface code libraries to substitute for corresponding ones of the one or more user interface controls of the one or more user interface code libraries comprises:
    querying a repository storing user interface code library deprecation information.

10. A method according to claim 8, wherein the request is received from an integrated development environment application.

11. A method according to claim 7, wherein the request is received from an integrated development environment application.

12. A method according to claim 7, wherein the request is received from the first user interface application.

13. A non-transitory medium storing processor-executable process steps, the process steps executable to cause a system to:
    receive a request to analyze compatibility of a first user interface application associated with a first version of user interface code libraries with a second version of user interface code libraries; and
    in response to the request:
        retrieve the second version of user interface code libraries;
        determine whether one or more user interface code libraries referenced in the first user interface application are not in the second version of user interface code libraries; and
        if it is determined that one or more user interface code libraries referenced in the first user interface application are not in the second version of user interface code libraries:
            determine one or more user interface controls of the one or more user interface code libraries which are referenced in the first user interface application;
            determine one or more user interface controls of the second version of user interface code libraries to substitute for corresponding ones of the one or more user interface controls of the one or more user interface code libraries which are referenced in the first user interface application; and
            present the determined one or more user interface controls of the second version of user interface code libraries.

14. A medium according to claim 13, the process steps executable to cause a system to:
receive an instruction to substitute the determined one or more user interface controls of the second version of user interface code libraries for corresponding ones of the one or more user interface controls of the one or more user interface code libraries which are referenced in the first user interface application; and
modify the first user interface application to substitute the determined one or more user interface controls of the second version of user interface code libraries for corresponding ones of the one or more user interface controls of the one or more user interface code libraries which are referenced in the first user interface application.

15. A medium according to claim 14, wherein determination of the one or more user interface controls of the second version of user interface code libraries to substitute for corresponding ones of the one or more user interface controls of the one or more user interface code libraries comprises:
    querying of a repository storing user interface code library deprecation information.

16. A medium according to claim 14, wherein the request is received from an integrated development environment application.

17. A medium according to claim 13, wherein the request is received from the first user interface application.

* * * * *